United States Patent Office 3,336,002
Patented Aug. 15, 1967

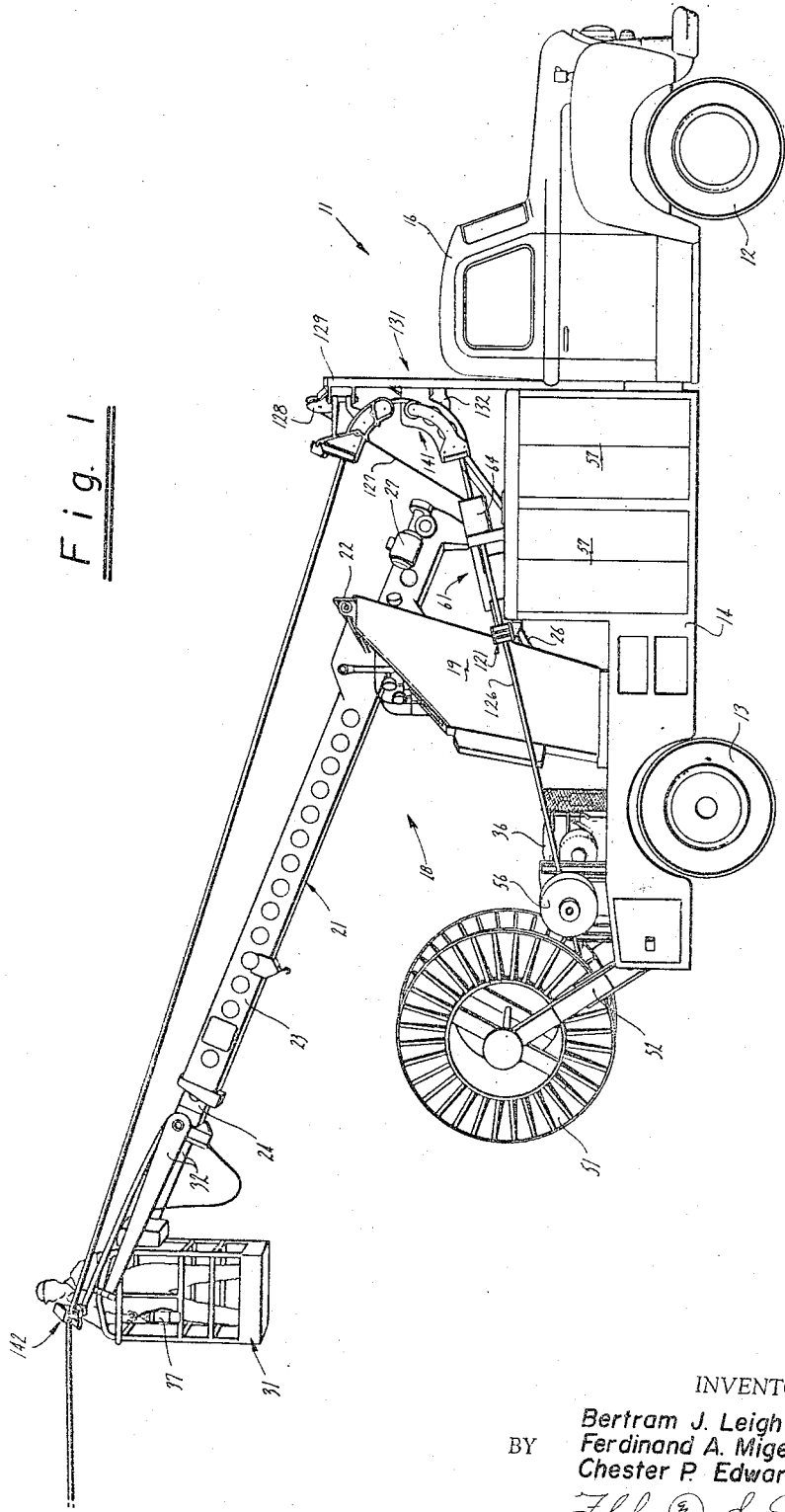

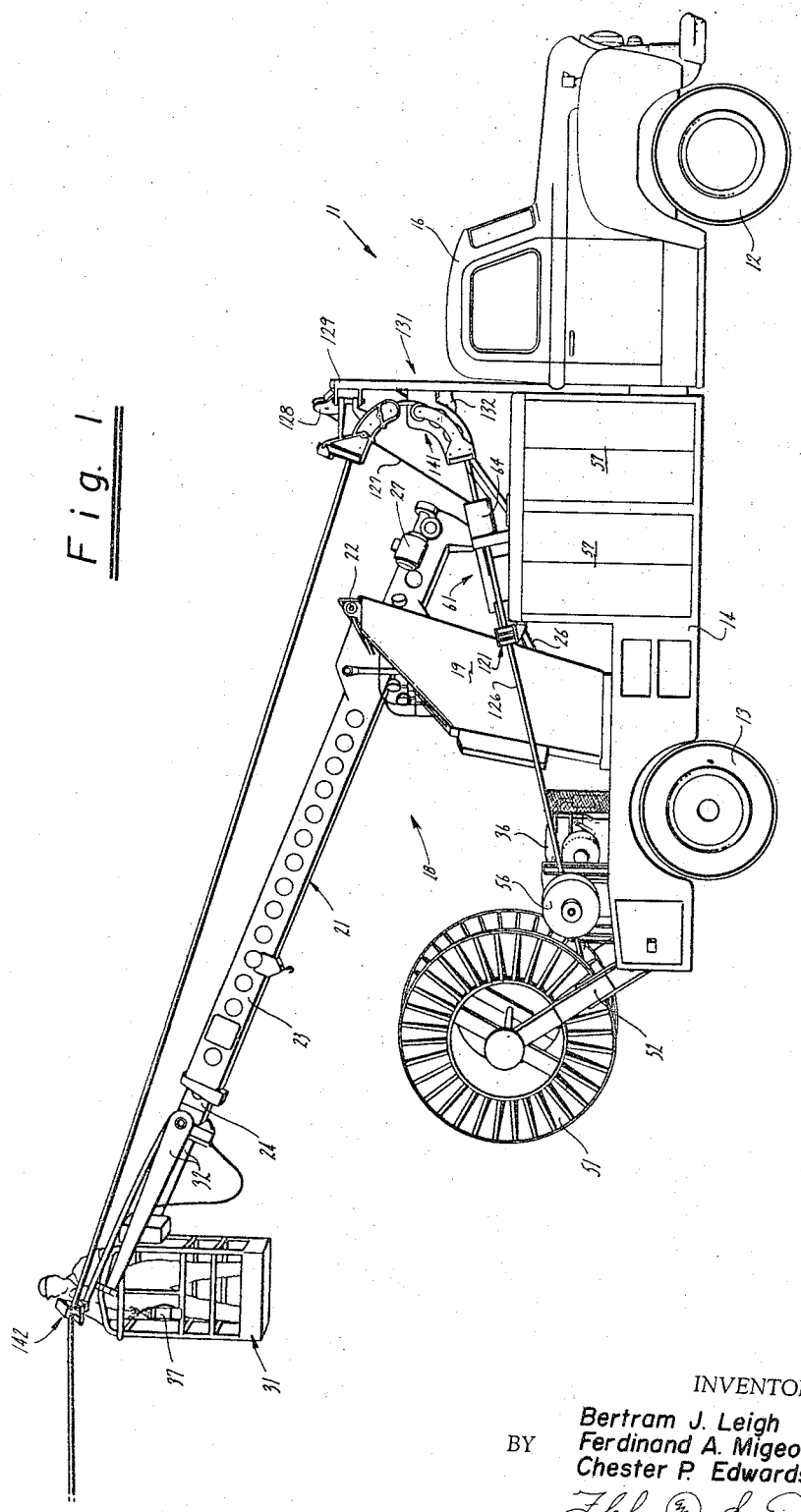

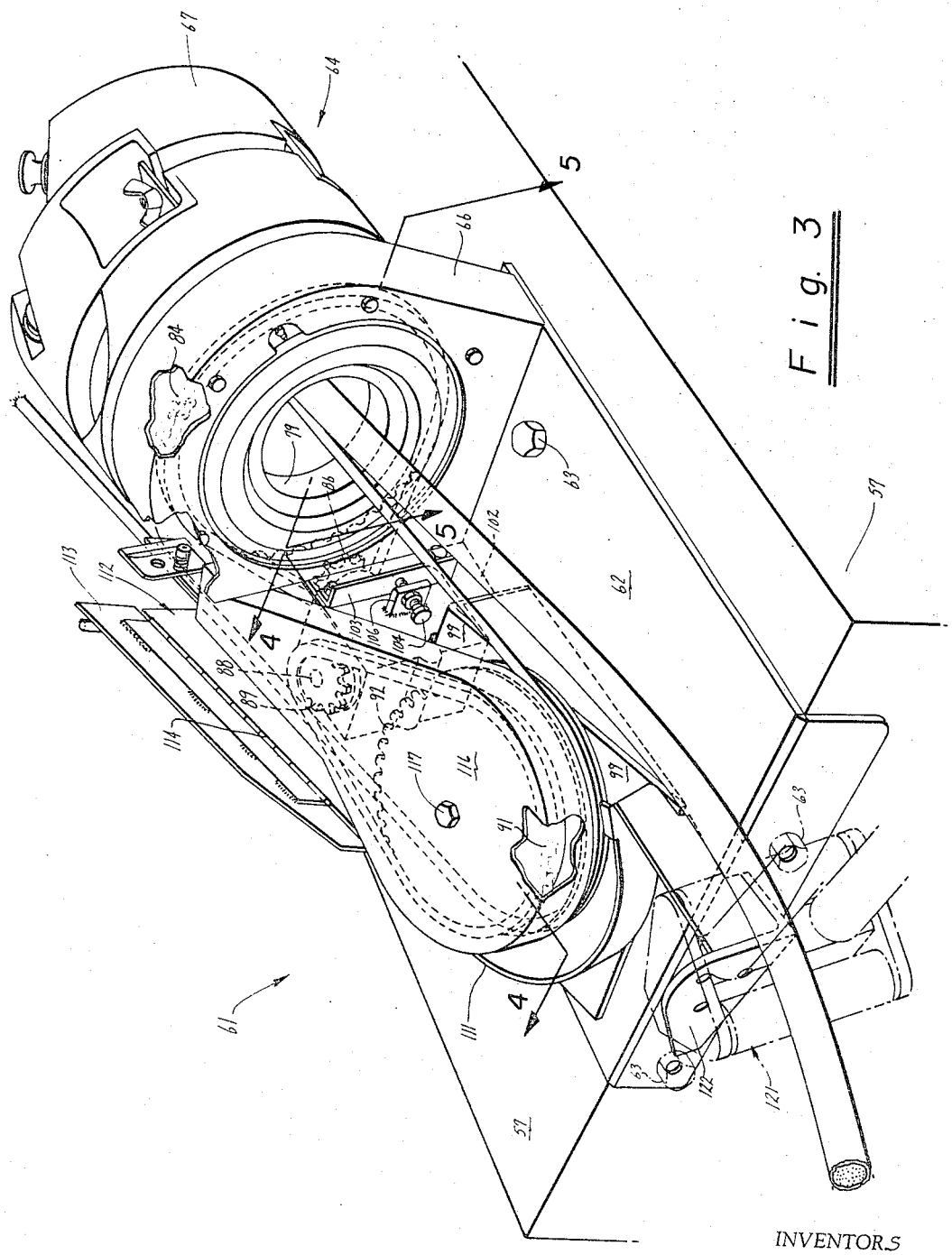

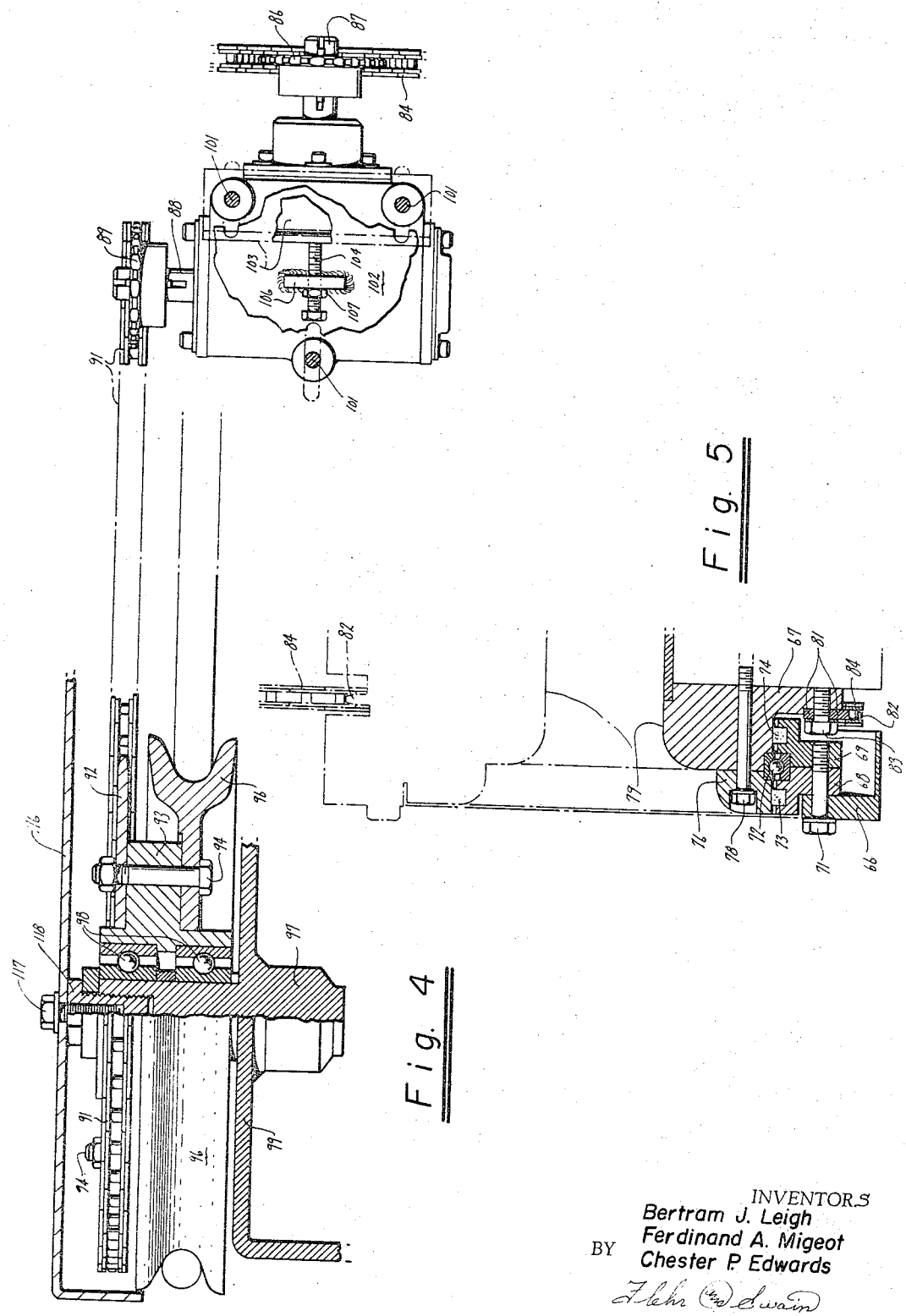

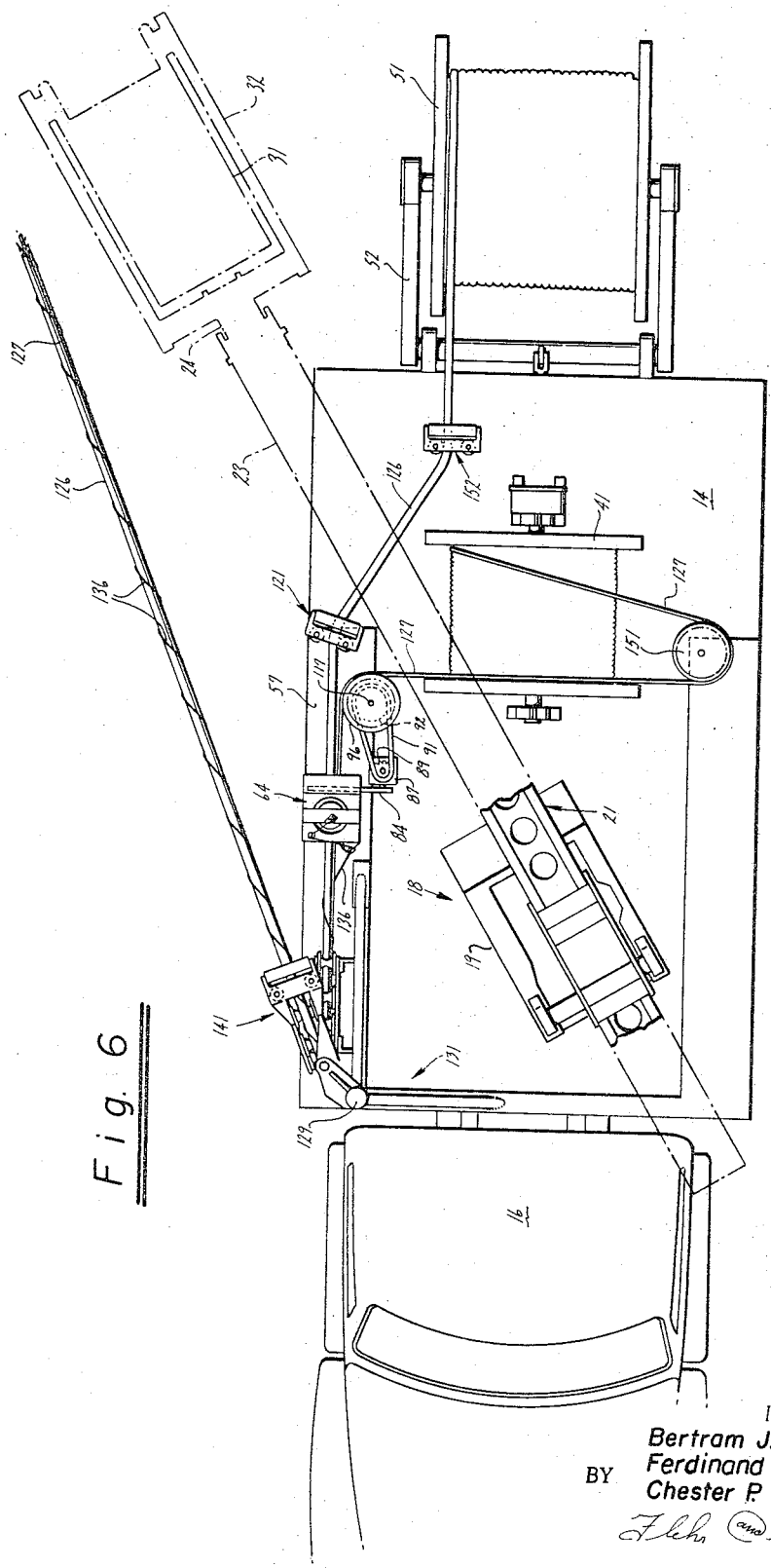

3,336,002
APPARATUS FOR LASHING AND PLACING AERIAL CABLE AND STRAND
Bertram J. Leigh, Redwood City, Ferdinand A. Migeot, Oakland, and Chester P. Edwards, South San Francisco, Calif., assignors to Telsta Corporation, San Carlos, Calif., a corporation of California
Filed July 30, 1965, Ser. No. 476,012
16 Claims. (Cl. 254—134.3)

This invention relates to an apparatus for lashing and placing aerial cable and strand.

In copending application Ser. No. 390,988, filed Aug. 20, 1964, now United States Letters Patent No. 3,279,758, there is disclosed an apparatus and method for lashing and placing aerial cable and strand. However, the lashing apparatus therein disclosed is substantially conventional and incorporates features which are not required when the lashing apparatus is mounted on a platform or vehicle and which, therefore, increases the cost of the lashing apparatus. In addition, the lashing apparatus therein is not positively driven, making possible slippage of the barrel of the lashing apparatus. Also, the lashing apparatus therein disclosed is not particularly adapted for incorporation in kit form for supplying to users of lifts not having prelashing apparatus mounted thereon. There is, therefore, a need for a new and improved apparatus for lashing and placing aerial cable and strand.

In general, it is an object of the present invention to provide an apparatus for lashing and placing aerial cable and strand which utilizes a positively driven lasher.

Another object of the invention is to provide an apparatus of the above character in which the lasher has a greatly simplified construction.

Another object of the invention is to provide apparatus of the above character in which the lasher can be incorporated into a kit form to be supplied for use on lifting equipment already in the field.

Additional objects and features of the invention will appear from the following description in which the preferred embodiments are set forth in detail in conjunction with the accompanying drawings.

Referring to the drawings:

FIGURE 1 is a side elevational view of an apparatus for lashing and placing aerial cable and strand incorporating the present invention.

FIGURE 2 is a perspective rear elevational view of a portion of the apparatus shown in FIGURE 1.

FIGURE 3 is another enlarged perspective view with certain parts broken away showing a portion of the apparatus shown in FIGURE 2.

FIGURE 4 is a cross-sectional view showing a portion of the lashing apparatus shown in FIGURE 3.

FIGURE 5 is a cross-sectional view taken along line 5—5 of FIGURE 3.

FIGURE 6 is a top plan view of another embodiment of the apparatus for lashing and placing aerial cable and strand incorporating the present invention.

In general, the apparatus for lashing and placing aerial cable and strand consists of a mobile platform with at least one reel of cable and one reel of strand mounted in the vicinity thereof. Lashing apparatus is carried upon the platform and includes a rotatable barrel. A continuous annular drive member is secured to the barrel and means is engaged by the strand for positively driving the annular drive member.

As shown in the drawings, the apparatus for lashing and placing aerial cable and strand consists of a self-propelled vehicle 11 having front and rear wheels 12 and 13 upon which a framework or platform 14 is mounted. A conventional cab 16 is mounted on the front of the self-propelled vehicle and contains means (not shown) for supplying motive power to the wheels 12 and 13.

Lifting equipment 18 of the type described in copending application Ser. No. 390,988, filed Aug. 20, 1964, is mounted on the platform 14. As pointed out therein, the lifting equipment 18 can be of any suitable type such as one with an extensible boom structure shown in the drawings, or in the alternative, one with an articulated boom structure well known to those skilled in the art.

The lifting equipment 18, as shown in the drawings, is provided with a load supporting structure or turret 19 which is mounted upon the platform in a manner such as shown in United States Letters Patent 2,841,404. As disclosed in that patent, the load supporting structure is mounted for rotation about a vertical axis. An extensible boom structure 21 is mounted upon the load supporting structure for rotation about a horizontal axis formed by the pivot shaft 22. The extensible boom structure 21 is provided with an outer section 23 and an inner telescoping section 24. Means is provided which includes a chain 26 for raising and lowering the outer end of the boom structure about the horizontal axis 22 and is generally of the type disclosed in United States Letters Patents 3,055,459 and 2,996,141. Means is also provided for extending or retracting an inner telescoping boom section with respect to the outer boom section 23 and includes a drive motor 27 and is generally of the type disclosed in United States Letters Patent 2,896,750.

The workman's or operator's platform or basket 31 is mounted on the outer or free end of the boom structure 21 by suitable means such as pivotally connecting the same to a pair of arms 32 which are secured to the outer end of the inner boom section 24. Control and power means is provided for controlling operation of the boom structure either from the workman's platform or basket 31, or from the ground, or from the vehicle itself. Such means includes a motor generator set 36 which is mounted to the rear and on one side of the platform 14. Suitable means which includes a control mechanism 37 mounted in the basket 31 is provided for supplying power from the motor generator set 36 to the electric motors which are utilized for rotating the lift support structure about a vertical axis, for raising or lowering the outer end of the boom structure 21 about the horizontal axis 22 and extending or retracting the inner boom section 24 with respect to the outer boom section 23. The control mechanism 37 is of the type described in United States Letters Patent 2,841,404.

At least one reel 41 of strand is carried upon the vehicle 11 upon the platform 14 adjacent the rear of the cab 16. Means (not shown) is provided for rotatably mounting each of the reels of strand upon the platform 14 and can be of the type disclosed in copending application Ser. No. 390,988, filed Aug. 20, 1964. As therein disclosed, such mounting means can also include a brake (not shown) to retard the rotation of the reel 41. As can be seen from FIGURE 2, reel 41 is mounted on the vehicle so that its axis of rotation is inclined with respect to the longitudinal axis of the vehicle.

At least one reel 51 of cable is carried by or adjacent to the vehicle. As shown in FIGURE 1 of the drawings, the reel 51 can be carried upon the vehicle by a hydraulically operated lift 52 of the type described in copending application Ser. No. 390,988, filed Aug. 20, 1964, and which also may include braking means (not shown) as also described in said copending application.

A power operated winch 56 is also mounted upon the platform 14 for use in general cable placement operations. Cabinets 57 are also mounted upon the platform.

A lasher assembly 61 is carried by the vehicle upon the cabinets 57. The lasher assembly consists of a base plate 62 which is adapted to be secured to the top of the cabinets 57 by suitable means such as bolts 63. A lasher 64 is mounted upon the base plate 62 and consists of a lasher frame 66 which is secured to the base plate 62 by suitable means such as welding. A barrel 67 is rotatably mounted in the lasher frame. As shown particularly in FIGURE 4, a pair of retaining rings 68 and 69 are secured to the lasher frame 66 by suitable means such as cap screws 71. The retaining rings 68 and 69 carry the outer race of a ball bearing assembly 72 and also carry felt seals 73 and 74 disposed on opposite sides of the ball bearing assembly 72. The inner race of the ball bearing assembly 72 is secured between the barrel 67 and a retaining ring 76 is secured to the barrel 67 by screws 78. The barrel 67 is provided with a bore or passage 79 which extends therethrough and which is adapted to receive the cable and strand to be lashed as hereinafter described. The barrel 67 is continuous or, in other words, is not provided with a slot extending longitudinally of the barrel because it is not necessary to place the lasher over the strand or cable because the end of the strand or cable can be passed directly through the bore or passage 79.

Means is provided for positively driving the barrel and consists of an annular continuous sprocket 81 which is provided with teeth 82 extending around the circumference of the barrel 67. The sprocket 81 is secured to the barrel 67 by suitable means such as cap screws 83. The lasher also includes conventional reel means for carrying the lashing wire which is to be lashed about the cable and strand and, therefore, is not shown.

The sprocket 81 serves as the driven annular member and positive means is provided for driving the same comprising a chain 84. The chain 84 is driven by a sprocket 86 carried by the output shaft 87 of a right angle gear unit 87. The gear unit 87 is provided with an input shaft 88 which has a sprocket 89 mounted thereon. The sprocket 89 is driven by chain 91 which is driven by a sprocket 92. The sprocket 92 is secured to a hub 93 by suitable means such as bolts 94. A strand sheave 96 is also secured to the hub 93 by the bolts 94. The hub 93 is rotatably mounted upon a stud shaft 97 by a pair of ball bearing assemblies 98. The stud shaft 97 is mounted upon an inclined sheave base 99 which is mounted upon the base plate 62.

Means is provided for adjusting the tension on the chain 91 and consists of means for adjusting the position of the gear unit 87. This means consists of cap screws 101 which extend through a support plate 102 mounted on the base plate 62. The screws 101 extend through elongate holes (not shown) so that the gear unit can be shifted towards or away from the large sprocket 92. An angle member 103 is secured to the front screws 101 and is adapted to be engaged by a large screw 104 threaded into an abutment 106 welded to the plate 102 which is adapted to engage the angle member 103 and to urge the same away from the sprocket 92 to tighten the chain 91. A lock nut 107 is provided on the screw 104 to lock it in the desired position.

A sheave guard member 111 is mounted upon the sheave base 99 and extends substantially around the sheave 96 as shown in FIGURE 3 and rearwardly in the direction of entrance of the strand to the sheave to provide one side wall of a strand chute 112. The other side wall of the strand chute 112 is formed by a member (not shown) parallel to the outer portion of the guard member 111. The strand cover 113 is secured by a hinge 114 to a guard member 111 and is adapted to cover the strand chute 112. A chain guard over 116 is mounted over the chain 91 and the sprocket 92 and is secured to the stationary stud shaft 97 by a cap screw 117 which is threaded into a retaining member 118 threaded into the stud shaft 97.

A fairlead assembly 121 similar to the type described in Patent No. 2,949,279, is mounted upon a mounting plate 122 secured to the base plate 62.

From the foregoing description, it can be seen that the entire lasher assembly 61 can be removed from the cabinets 57 by removing the bolts 63 and that the lasher assembly 61 can be supplied as a kit for use on lifting equipment of the type described.

Means is provided on the platform 14 for guiding the cable 126 from the reel 51 and for guiding the strand 127 from the reel 41. As shown in the drawings, such means can consist of a strand block assembly 128 carried on a post 129 mounted upon the cabinets 57 and forming a part of a framework 131 mounted upon the platform 14 to the rear of the cab 16 as shown particularly in FIGURE 1. The strand, after it passes through the strand block assembly 128, passes through another strand block assembly 132 swivel mounted upon the framework 131 directly below the swivel mounted strand block assembly 128. The strand 127 then passes rearwardly into the strand chute 112 and then passes over the sheave 96 and through the bore or passage 79 provided in the barrel of the lasher 64. The cable 126 from the reel 51 passes directly through the fairlead assembly 121 and into the passage 79 in the barrel of the lasher 64.

As hereinafter described, the cable 126 and the strand 127 are lashed together by lashing wire 136 and the lashed assembly passes through a split bull wheel assembly 141 upon the post 129 and of a type generally described in United States Letters Patent 3,103,345. The lashed cable and strand thereafter passes through a fairlead assembly 142 carried at the end of the boom structure 21 where it can be properly positioned by the operator in the workman's basket controlling the position of the workman's basket and the outer end of the boom by the control switch 37.

Operation of the apparatus shown in FIGURES 1–4 may now be briefly described as follows. Let it be assumed that it is desired to prelash cable and strand with the apparatus shown in the drawings. The end of the cable 126 is taken from the reel 51 and passed through the bore 79 in the lasher 64. The end of the strand 127 and the reel 41 are passed through the strand block assembly 128 and then through the strand block assembly 132 through the strand chute 112 and over the sheave 96 and into the passage 79 of the lasher 64. Thereafter, the strand and cable are passed through the swivel bull wheel assembly 141 and through the fairlead 142 and secured to the pole line in the desired position. It can be seen that as the strand 127 is advanced under tension, it will cause rotation of the sheave 96 which, in turn, will cause rotation of the sprocket wheel 92. The sprocket wheel 92 drives the chain 91 which drives the gear unit 87. The gear unit 87 drives the chain 84 which directly drives the sprocket 81 carried by the barrel to cause rotation of the barrel and to cause the lashing wire 136 carried thereby to be lashed about the cable and strand as shown particularly in FIGURE 2.

From the foregoing, it can be seen that positive means has been provided for driving the lasher. In other words the barrel of the lasher 64 is directly driving by the sprocket 92 driven by the sheave 96. Thus, it can be seen that the lasher 64 is at all times positively driven by the strand 127 to ensure that a uniform wrap of the lashing wire 136 is made about the strand and cable.

In addition, it can be seen from FIGURE 2 that the path of travel for the strand 127 is relatively simple and that only a partial wrap is made about the sheave 96. It has been found that this partial wrap around the sheave 96 is more than adequate to positively drive the lasher as hereinbefore described. This relative simple path of travel for the strand makes it easy to place the apparatus in operation. The cable 126 travels directly from the reel 51 through the lasher 64 as shown.

Another embodiment of the apparatus for lashing and placing aerial cable and strand is shown in FIGURE 6. As can be seen from the drawing, this embodiment is very similar to the one shown in FIGURES 1–4 with the exception that the lifting equipment 18 is mounted on the front of the platform 14 adjacent the cab 16 of the vehicle 11 so that the boom structure 21 normally extends to the rear of the platform 14. When the lifting equipment 18 is positioned in this manner, it is desirable to position the strand reel 41 on the rear of the platform. When the strand reel 41 is positioned in this manner, the strand 127 passes over a strand sheave 151 rotatably mounted upon the other side of the platform 14 and then passes directly to the sheave 96 of the lasher assembly 61 and into the lasher 64. The cable 126 from the reel 51 passes through a fairlead assembly 152 mounted upon the platform 14 and then through a fairlead assembly 121 supported upon the platform 14 and then passes directly into the lasher 64.

The operation of this embodiment of the apparatus is substantially identical to the operation of the apparatus shown in FIGURES 1–4. In this embodiment as in the previously described embodiment, the strand serves to positively drive the sheave 96 which directly drives the barrel of the lasher 64 to cause lashing wire to be wrapped about the cable and strand to lash the same together so that when it passes through the bull wheel assembly 141, it has already been lashed so that it can be placed under tension and supported upon the spaced poles forming the pole line upon which the cable is to be mounted.

It is apparent from the foregoing that we have provided a new and improved apparatus for lashing and placing aerial cable and strand which is relatively simple and which ensures that the strand is positively lashed over the strand and cable. The lasher assembly is constructed in such a manner that it can be removed from the vehicle when it is not desired.

We claim:

1. In apparatus for placing aerial cable and strand, a platform, at least one reel of cable, means for rotatably mounting the reel of cable so that it is positioned in the vicinity of the platform, at least one reel of strand, means for rotatably mounting the reel of strand on the platform, lashing apparatus carried upon the platform, guiding means mounted upon the platform for guiding cable from the reel of cable into the lashing apparatus, means for guiding the strand from the reel of strand into the lashing apparatus, said lashing apparatus including a barrel having a central passage therein through which the cable and strand pass, said lashing apparatus including means carrying lashing wire and means for rotatably mounting the barrel, a continuous annular driven member secured to the barrel and having an opening through which the cable and strand pass in alignment with the central passage, in the barrel, a sheave mounted on said platform to the rear of the barrel and being adapted to be engaged by and driven by the strand, said means for guiding the strand further including means supplying the strand to the sheave in a direction which is at least 90° removed from the direction at which the strand enters the barrel, and means driven by said sheave for driving said annular driven member secured to the barrel to positively drive the barrel as the cable and strand are drawn through the lasher to cause the lashing wire to lash the cable to the strand.

2. In apparatus of the character described, a wheeled self-propelled vehicle having a chassis and a cab mounted on the front end of the chassis, a platform mounted on the chassis to the rear of the cab, at least one reel of cable, means rotatably mounting the reel of cable so that it is positioned in the vicinity of the platform, at least one reel of strand, means rotatably mounting the reel of strand so that it is in the vicinity of the platform, a lifting equipment, said lifting equipment including a lift supporting structure rotatably mounted upon the platform for movement about a vertical axis and a boom structure mounted on the lift supporting structure for movement about a horizontal axis, cable guiding means carried by the boom structure, a lasher assembly mounted upon the platform, said lasher assembly including a lasher having an outer housing and a barrel rotatably mounted in the housing, a continuous annular drive member secured to the barrel, said barrel having a central opening therein, guide means for guiding the cable from the cable reel into the opening in said barrel, additional guide means for guiding the strand into the opening in said barrel, said additional guide means including at least one rotatable sheave for guiding said strand into the opening in said barrel, means driven by said sheave engaged by said strand for positively driving said continuous annular member secured to the barrel to cause the barrel to rotate and wrap lashing wire about the cable and strand as they are advanced through the lasher, and a bull wheel assembly mounted on the platform and adapted to receive the cable and strand after they have been lashed together.

3. Apparatus as in claim 2 wherein said means for driving said annular driven member is secured to the barrel from the sheave includes a gear box having input and output shafts, means for driving the input shaft of the gear box from the sheave, and means connected to the output shaft of the gear box for driving said annular driven member secured to said barrel.

4. Apparatus as in claim 3 together with a guard means mounted over said means for driving said driven member secured to the barrel from the output shaft of the gear box and additional guide means mounted over the means for driving the input shaft of the gear box from the sheave.

5. Apparatus as in claim 3 together with means for adjusting the position of the gear box relative to said sheave for tightening the means for driving said input shaft of said gear box from said sheave.

6. Apparatus as in claim 2 wherein said lift supporting structure is positioned to the rear of the strand reel.

7. Apparatus as in claim 2 wherein said lift supporting structure is positioned in front of the strand reel.

8. In a lasher assembly adapted to be used on apparatus for lashing and placing aerial cable and strand, a plate, a lasher mounted on said plate, said lasher having a housing and a barrel mounted for rotation about its longitudinal axis in the housing, said barrel having a centrally disposed opening extending therethrough, from the rear to the front along its longitudinal axis a continuous annular driven member secured to the barrel and having an opening through which the cable and strand pass in alignment with the centrally disposed opening in the barrel, a sheave rotatably mounted upon the plate to the rear of the barrel and adapted to be engaged by the strand, guide means mounted on the plate for guiding the strand to the sheave so that the strand first engages the sheave at a point which is at least 90° removed from the point at which the strand ceases to engage the sheave and enters the barrel parallel to the longitudinal axis of the barrel and means carried by said plate driven by the sheave for driving said annular driven member.

9. A lasher assembly as in claim 8 wherein said means for driving said annular driven member from said sheave includes a gear box mounted on said plate and having an input shaft and an output shaft, means for driving the input shaft of the gear box from said sheave, and means for driving the annular driven member secured to the barrel from said output shaft of the gear box.

10. A lasher assembly as in claim 9 wherein said means for driving the input shaft of the gear box from the sheave includes a flexible elongate element, and wherein means is provided for mounting the gear box on the plate to permit adjustment of the position of the gear box relative to the sheave to properly tension the flexible elongate element extending between the input shaft of the gear box and the sheave.

11. A lasher assembly as in claim 8 wherein said lasher is mounted upon said plate so that the passage extending through the barrel is inclined upwardly in a forward direction.

12. An apparatus for placing aerial cable and strand, a platform, at least one reel of cable, means for rotatably mounting the reel of cable so that it is positioned in the vicinity of the platform, at least one reel of strand, means for rotatably mounting the reel of strand on the platform, lashing apparatus carried upon the platform, guiding means mounted upon the platform for guiding cable from the reel of cable into the lashing apparatus, means for guiding the strand from the reel of strand into the lashing apparatus, a lift supporting structure rotatably mounted upon the platform, a boom structure mounted on the lift supporting structure, and cable guiding means carried by the boom structure and adapted to receive and guide the cable and strand after they have been lashed by the lashing apparatus, said lashing apparatus including a barrel having a central passage therein through which the cable and strand pass, means for rotatably mounting the barrel, a continuous annular driven member secured to the barrel, and means engaged by the strand for driving said annular driven member secured to the barrel to positively drive the lasher as the cable and strand are drawn through the lasher to cause lashing wire to lash the cable to the strand.

13. Apparatus as in claim 12 wherein said strand reel is positioned on the front of the platform and wherein the lift supporting structure is supported to the rear of the strand reel.

14. Apparatus as in claim 12 wherein the lift supporting structure is mounted on the front of the platform and wherein the strand reel is positioned to the rear of the lift supporting structure.

15. Apparatus as in claim 12 wherein said means engaged by the strand for driving said annular driven member consists of a sheave engaged by the strand, and means including a flexible elongate element for driving said annular driven member on said barrel from said drive member driven by said sheave.

16. Apparatus as in claim 15 wherein said means for driving said annular driven member mounted on said barrel from said drive member is secured to said sheave and includes a right angle gear unit.

References Cited

UNITED STATES PATENTS

| | | | |
|---|---|---|---|
| 2,153,072 | 4/1939 | Bookout | 75—10 |
| 2,272,253 | 2/1942 | St. John | 254—134.3 |
| 2,344,051 | 3/1944 | Neal | 254—134.3 |
| 2,544,313 | 3/1951 | Harley | 254—134.3 |
| 2,703,218 | 3/1955 | Haskell et al. | 254—134.3 |
| 3,172,643 | 3/1965 | Mattingly et al. | 254—134.3 |

OTHELL M. SIMPSON, *Primary Examiner.*